(12) United States Patent
Takahashi et al.

(10) Patent No.: US 8,090,757 B2
(45) Date of Patent: Jan. 3, 2012

(54) CIRCUIT AND METHOD FOR PERFORMING MULTIPLE MODULO MATHEMATIC OPERATIONS

(75) Inventors: Richard J. Takahashi, Phoenix, AZ (US); Kevin J. Osugi, Higley, AZ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1014 days.

(21) Appl. No.: 11/987,092

(22) Filed: Nov. 27, 2007

(65) Prior Publication Data

US 2009/0106342 A1    Apr. 23, 2009

Related U.S. Application Data

(62) Division of application No. 11/228,552, filed on Sep. 16, 2005, now Pat. No. 7,320,015, which is a division of application No. 09/971,325, filed on Oct. 4, 2001, now Pat. No. 6,973,470.

(60) Provisional application No. 60/297,833, filed on Jun. 13, 2001.

(51) Int. Cl.
   *G06F 7/30* (2006.01)
(52) U.S. Cl. .......................................... 708/491
(58) Field of Classification Search ........... 708/491–492
   See application file for complete search history.

(56) References Cited

U.S. PATENT DOCUMENTS

| | | | |
|---|---|---|---|
| 4,392,710 A | | 7/1983 | Rogers |
| 4,532,638 A | * | 7/1985 | Lagger et al. ................. 708/491 |
| 5,144,574 A | | 9/1992 | Morita |
| 5,206,824 A | * | 4/1993 | Arazi ............................ 708/492 |
| 5,289,397 A | | 2/1994 | Clark et al. |
| 5,448,639 A | | 9/1995 | Arazi |
| 5,570,307 A | | 10/1996 | Takahashi |
| 5,835,862 A | | 11/1998 | Nykanen et al. |
| 5,854,759 A | * | 12/1998 | Kaliski et al. ................. 708/492 |
| 5,961,578 A | | 10/1999 | Nakada |
| 6,064,740 A | | 5/2000 | Curiger et al. |
| 6,085,210 A | | 7/2000 | Buer |
| 6,141,422 A | | 10/2000 | Rimpo et al. |
| 6,151,393 A | | 11/2000 | Jeona |
| 6,182,104 B1 | | 1/2001 | Foster et al. |
| 6,209,016 B1 | | 3/2001 | Hobson et al. |
| 6,356,636 B1 | | 3/2002 | Foster et al. |
| 6,377,969 B1 | | 4/2002 | Orlando et al. |
| 6,415,310 B1 | | 7/2002 | Takenaka et al. |
| 6,748,410 B1 | | 6/2004 | Gressel et al. |
| 6,748,412 B2 | | 6/2004 | Ruehle |
| 7,017,064 B2 | | 3/2006 | Thomas et al. |
| 7,046,800 B1 | | 5/2006 | Tenca et al. |

(Continued)

OTHER PUBLICATIONS

Guo et al., "A Novel Digit-Serial Systolic Array for Modular Multiplication", IEEE International Symposium on Circuits and Systems, 2:11-177-II180, 1998.

(Continued)

*Primary Examiner* — Tan V Mai
(74) *Attorney, Agent, or Firm* — Davidson Berquist Jackson & Gowdey, LLP

(57) ABSTRACT

A multi-function modulo processor architecture is capable of performing multiple modulo mathematic operations. The modulo processor includes a pipeline processing portion that iteratively computes a running partial modulo product using the operands of a modulo mathematic argument to obtain one or more final partial modulo products. The final partial modulo product is post-processed to obtain the final result.

1 Claim, 10 Drawing Sheets

U.S. PATENT DOCUMENTS

| | | |
|---|---|---|
| 7,111,166 B2 | 9/2006 | Dror et al. |
| 2001/0010077 A1 | 7/2001 | McGregor et al. |
| 2002/0039418 A1 | 4/2002 | Dror et al. |
| 2002/0059353 A1 | 5/2002 | Koc et al. |
| 2002/0116429 A1 | 8/2002 | Chen et al. |
| 2003/0031316 A1 | 2/2003 | Langston et al. |
| 2003/0065696 A1 | 4/2003 | Ruehle et al. |
| 2003/0140077 A1 | 7/2003 | Zaboronski et al. |
| 2003/0212729 A1 | 11/2003 | Eberle et al. |
| 2004/0019622 A1 | 1/2004 | Elbe et al. |
| 2004/0054705 A1 | 3/2004 | Le Quere |
| 2004/0066934 A1 | 4/2004 | Chen |
| 2004/0260741 A1 | 12/2004 | Plessier |

OTHER PUBLICATIONS

Parhami, B., "Computer Arithmetic: Algorithms and Hardware Designs", Oxford University Press, N.Y., pp. 162-166, 2000.

Savas et al., A Scalable and Unified Multiplier Architecture for Finite Fields GF(p) and GF(2m), CHES, 1965:277-292, 2000.

Kim. Young Sae et al., "Asynchronous implementation of 1024-bit modular processor for RSA cryptosystem," PRoceedings of the Second IEEE Asia Pacific Conference on ASICs, pp. 187-190, 2000.

Leu, Jye-Jong et al., "Design methodology for Booth-encoded Montgomery module design for RSA cryptosystem," The 2000 IEEE International Symposium on Circuits and Systems *ICSAS), vol. 5 pp. 357-360, 2000.

Taek-Won Kwon et al., "Two Implementation methods of a 1024-bit RSA cryptoprocessorbased on modified Montgomery algorithm," The 2001 IEEE International Symposium on Circuits and Systems, vol. 4, pp. 650-653, May 6-9, 2001.

U.S. Appl. No. 11/228,908—Dec. 30, 2009 PTO Office Action.
U.S. Appl. No. 11/228,908—May 26, 2010 PTO Office Action.
U.S. Appl. No. 11/228,908—Jan. 19, 2011 PTO Office Action.
U.S. Appl. No. 11/228,908—Aug. 1, 2011 PTO Office Action.

* cited by examiner

US 8,090,757 B2

CIRCUIT AND METHOD FOR PERFORMING MULTIPLE MODULO MATHEMATIC OPERATIONS

This application is divisional of U.S. application Ser. No. 11/228,552 filed Sep. 16, 2005 now U.S. Pat. No. 7,320,015, which is a divisional of U.S. application Ser. No. 09/971,325 filed Oct. 4, 2001 now U.S. Pat. No. 6,973,470, which claims the benefit of U.S. Provisional Application No. 60/297,833, filed Jun. 13, 2001 (entitled MULTIFUNCTION PIPE-LINED MODULO PROCESSOR), the entirety of which is incorporated herein by reference.

BACKGROUND OF THE INVENTION

1. Field of the Invention

The present invention relates to a high speed integrated circuit processor and method for performing modulo mathematics and, more particularly, to a multifunction processor and method for performing multiple modulo mathematic operations.

2. Description of Related Art

Data that is transferred over an interconnected computer network, such as the Internet, is susceptible to various forms of attack. These attacks may result in such things as loss of privacy, loss of data integrity, identity theft, denial of service, or any combination of these attacks. The ever-expanding popularity of the Internet for secure communications, e-commerce, and various other transactions, has led to the need to ensure communications over non-secure interconnected computer networks like the Internet are secure from such attacks.

Data that is transferred over non-secure networks, like the Internet, is protected from the above-noted attacks by encrypting at the data source, and then decrypting at the data destination. Numerous schemes have been developed and employed to provide such encryption/decryption functionality. Such schemes include the Diffie-Hellman Key Exchange, digital signature generation, and the RSA (Rivest-Sahmir-Adelman) Public Key cryptography. In these schemes, as well as other cryptographic schemes, modulo mathematics is integral to the implementation. Cryptographic algorithms, such as these, that use modulo mathematics are quite robust. However, as the size of the encryption/decryption keys used with these algorithms gets larger, the speed at which the algorithms encrypt/decrypt data decreases.

Thus, designers have sought to design various ways of increasing the speed at which these algorithms can process data, and specifically, have attempted to design devices that perform various modulo mathematic operations at higher and higher speeds. Unfortunately, each of these devices either uses complex control schemes, or is designed to perform only a single type of modulo mathematical operation. In particular, U.S. Pat. No. 6,085,210 is an example of a design that uses complex state machines to control exponentiation and multiplication. And U.S. Pat. No. 6,141,422 is an example of a design that can only perform a single modulo mathematical operation—modulo exponentiation.

Hence, there is a need in the art for a processor that is able to perform various modulo mathematic operations and implement the modulo mathematic operations using processing methods that are less complex than those now known and/or implemented.

SUMMARY OF THE INVENTION

The present invention provides a multi-function modulo processor architecture that is capable of performing multiple modulo mathematic operations. The present invention further provides for modulo processing methodologies for performing modulo multiplication, modulo exponentiation, and modulo reduction.

In one aspect of the present invention, and by way of example only, a circuit for computing a result of a modulo mathematic argument includes an operand storage portion, a pipeline processing stage, and a post-processing stage. The operand storage portion is operable to receive operands of a modulo mathematic argument. The pipeline processing stage is coupled to the operand storage portion and is operable to receive one or more of the operands and output a final partial modulo product by iteratively computing a running partial modulo product, using the one or more received operands, a predetermined number of times. The post-processing stage is coupled to receive the final partial modulo product from the pipeline processing stage and is operable to compute the result of the modulo mathematic argument using the final partial modulo product.

In another aspect of the present invention, a processor for computing one or more final partial modulo products by a iteratively computing a running partial modulo product of one or more operands a predetermined number of times includes M-number of carry-save processors. The M-number of carry-save processors are coupled together in a series-ring configuration with one another, and each carry-save processor is operable to compute one or more of the running partial modulo products. The running partial modulo product outputted by the M-th carry-save processor is one of the one or more final partial modulo products when the running partial modulo products have been iteratively computed the predetermined number of times.

In still another aspect of the present invention, a carry-save processor for performing a carry-save add of at least a first operand, a second operand, and a third operand, the carry-save processor includes an AND gate stage, a carry-save adder stage, and a shift-right stage. The AND gate stage is coupled to receive a single bit of the first operand and all bits of the second operand, and is operable to output a logical AND thereof. The carry-save-adder stage is coupled to receive the logical AND output from the AND gate stage, the third operand, and one of the running partial modulo products from another carry-save processor, and is operable to compute a first sum of at least portions of each of the received data. The shift-right stage is coupled to receive the first sum from the carry-save adder stage, shift the sum right a predetermined number of bits, and output an other one of the running partial modulo products.

In yet a further aspect of the present invention, a method of performing a modulo N multiplication of at least a first operand (A) and a second operand (B), to obtain a result thereof (AB mod N) includes iteratively computing a partial modulo product of A, B, and N a predetermined number of times to obtain a final partial modulo product. The result of the modulo N multiplication is recovered from the final partial modulo product.

In yet another aspect of the present invention, a method of computing a partial modulo product of two operands, wherein the operands (A, B) and modulus (N) are each binary numbers of a predetermined bit length includes performing a first logical AND of a single bit of the first operand (A) with all the bits of the second operand (B) to obtain a first logical AND result. The first logical AND result is then summed with a previous one of the iteratively computed partial modulo products to obtain a first sum having a least significant bit. A second logical AND of the first sum least significant bit with all the bits of the modulus (N) is performed to obtain a second logical AND result. The second logical AND result is summed with the first sum to obtain a second sum. The second sum bit length is reduced by one.

In another aspect of the present invention, a method of performing a modulo N exponentiation of a first operand (A) raised to an exponent (E), wherein A, E, and N are each binary numbers of predetermined bit lengths, includes setting a count value (K) to one less than the predetermined bit length of the exponent (E). A modulo N multiplication of a second operand (B) multiplied by itself (BB mod N) is then computed. A modulo N multiplication of the first (A) and the second (B) operands (AB mod N) is computed when a K-th bit of the exponent (E) is a one. The count value (K) is then decremented by one, and the various ones of the steps are repeated until the count value (K) equals one.

In yet still a further aspect of the present invention, a method of performing a modulo N exponentiation of a first operand (A) raised to an exponent (d), wherein N is equal to a product of a first integer (p) and a second integer (q), and wherein a first variable (dp=d mod (p−1)), a second variable (dq=d mod (q−1)), and a third variable (Q=q$^{-1}$ mod p) are known, includes computing $A_p = A^{dp}$ mod p, and $A_q = A^{dq}$ mod q. Then, $(Y_0) = (A_p - A_q)$ mod p is computed, followed by $Y_1 = (QY_0)$ mod p, and $Y_2 = (qY_1)$. Thereafter $X = (Y_2 + A_q)$ mod N is computed, where X is equivalent to $A^d$ mod N.

In still a further aspect of the present invention, a system for encrypting/decrypting data includes an input/output (I/O) interface, an encryption/decryption engine, and one or more processors. The I/O interface is operable to receive and transmit data. The encryption/decryption engine is coupled to receive data from, and transmit data to, the I/O interface and is operable to encrypt/decrypt the received data. The one or more processors are coupled to receive one or more operands from the encryption/decryption engine and are operable to compute a result of a modulo mathematic argument. Each of the processors includes an operand storage portion, a pipeline processing stage, and a post-processing stage. The operand storage portion is operable to receive operands of a modulo mathematic argument. The pipeline processing stage is coupled to the operand storage portion and is operable to receive one or more of the operands and output a final partial modulo product by iteratively computing a running partial modulo product, using the one or more received operands, a predetermined number of times. The post-processing stage is coupled to receive the final partial modulo product from the pipeline processing stage and is operable to compute the result of the modulo mathematic argument using the final partial modulo product.

Other independent features and advantages of the invention will become apparent from the following detailed description, taken in conjunction with the accompanying drawings which illustrate, by way of example, the principles of the invention.

DETAILED DESCRIPTION OF THE PREFERRED EMBODIMENTS

Figure 1:
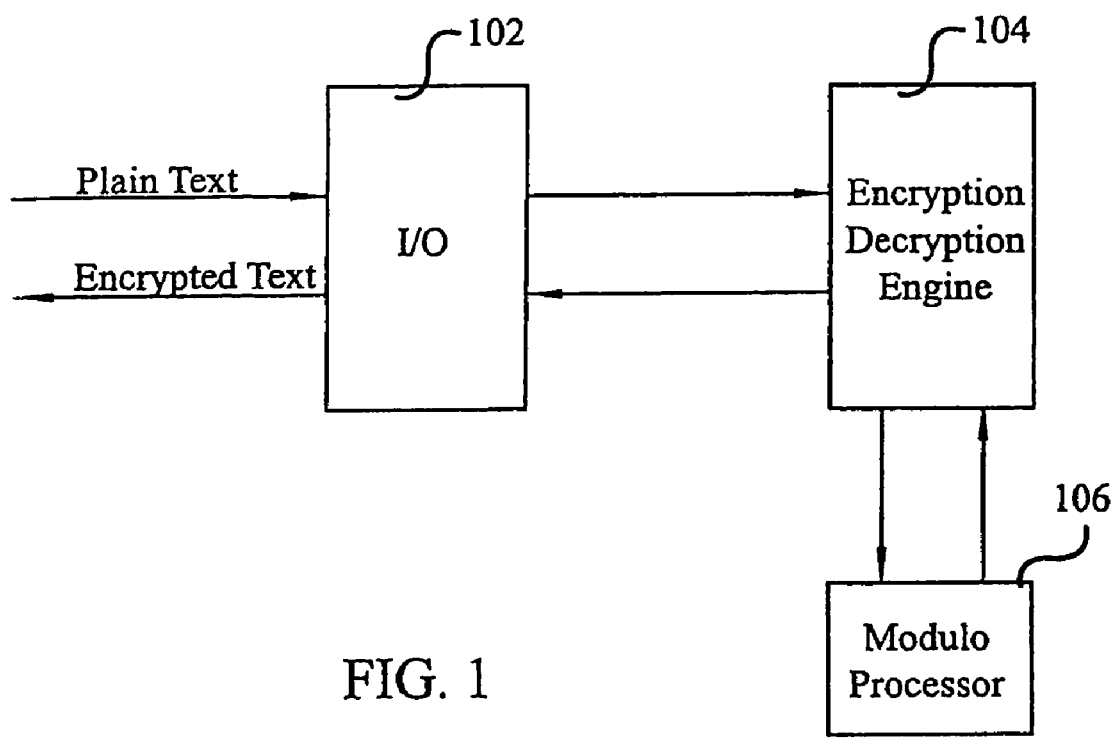
FIG. 1 is a functional block diagram of an encryption/decryption system that employs the processor of the present invention.

The present invention may be utilized as part of an encryption and/or decryption system, or as a stand-alone modulo mathematics computer. A block diagram of the first environment, that is, as part of an encryption/decryption system 100 is depicted in FIG. 1. As FIG. 1 illustrates, the system 100 includes an input/output (I/O) interface 102, an encryption/decryption engine 104, and a modulo processor 106. The I/O interface 102 is coupled to the encryption/decryption engine 104 and, as its name connotes, is operable to transfer data to, and receive data from, the encryption/decryption engine 104. In particular, the I/O interface 102 receives plaintext data or encrypted data from a source and transfers this data to the encryption/decryption engine 104, and receives encrypted or decrypted data from the encryption/decryption engine 104 and transfers this data to its intended destination. The I/O interface 102 may be any one of numerous I/O interfaces known in the art that perform this function.

The encryption/decryption engine 104, as was noted above, is coupled to the I/O interface 102 and either encrypts or decrypts the data received from the I/O interface 102. The encryption/decryption engine 104 then transfers the encrypted or decrypted plaintext data to the I/O interface 102 for transfer elsewhere. It will be appreciated that the encryption/decryption engine 104 may be any one of numerous hardware or software encryption/decryption devices that implement any one of numerous encryption/decryption schemes known in the art. Non-limiting examples include, but are not limited to, the encryption/decryption engine 104 may implement the RSA (Rivest-Sahmir-Adelman) Public Key cryptography scheme and/or the Diffie-Hellman Key Exchange scheme.

The modulo processor 106 is coupled to the encryption/decryption engine 104 and is configured to perform the modulo mathematic operations that are needed to implement the encryption/decryption scheme carried out by the encryption/decryption engine 104. For example, if the encryption/decryption scheme implemented by the encryption/decryption engine 104 is the RSA scheme, the modulo processor will be required to perform various modulo exponentiations. Details of how the modulo processor 106 performs modulo exponentiation will be discussed further below.

Figure 2:
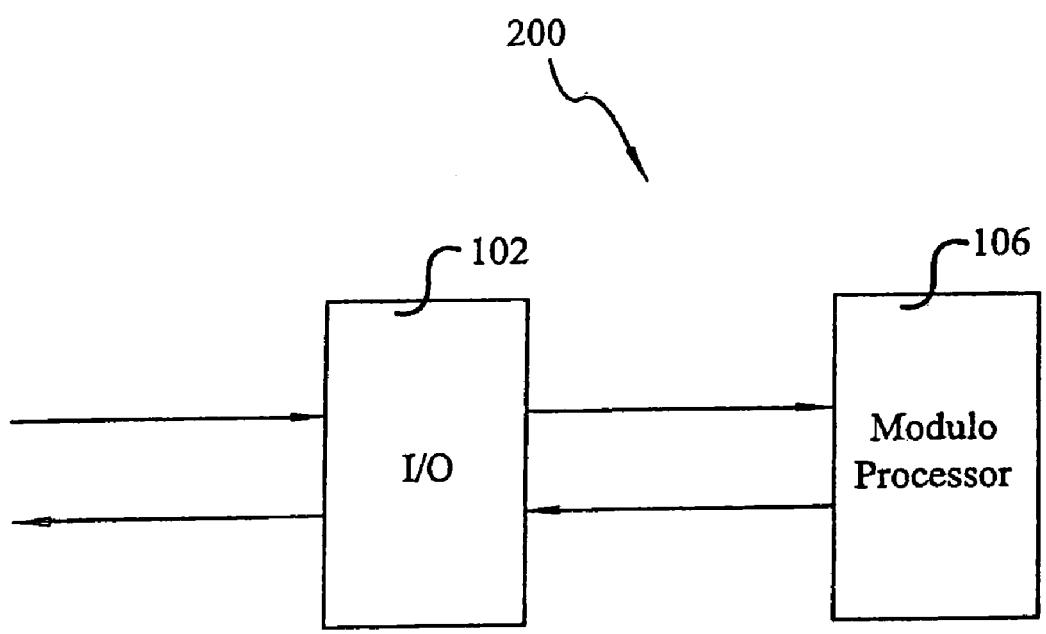
FIG. 2 is a functional block diagram of a modulo mathematics computer that employs the processor of the present invention.

The second environment mentioned above is a stand-alone modulo mathematics computer. One such computer 200 is depicted in FIG. 2, and includes the I/O interface 102 and the modulo processor 106. With this implementation, the I/O interface 102 receives modulo mathematic arguments, such as the operand and modulus, from a source and transfers each to the modulo processor 106. The modulo processor 106, which is coupled to the I/O interface 102, receives the arguments, performs the desired modulo mathematic operations thereon, and outputs the result to the I/O interface 102. The I/O interface 102 receives the result from the modulo processor 106 and transfers it to the intended destination.

Having described at least two environments in which the modulo processor 106 may be used, a more detailed description of the modulo processor 106 and the operations it carries out will now be provided. In doing so, reference should first be made to FIG. 3, which depicts a functional block diagram of the modulo processor 106.

Figure 3:
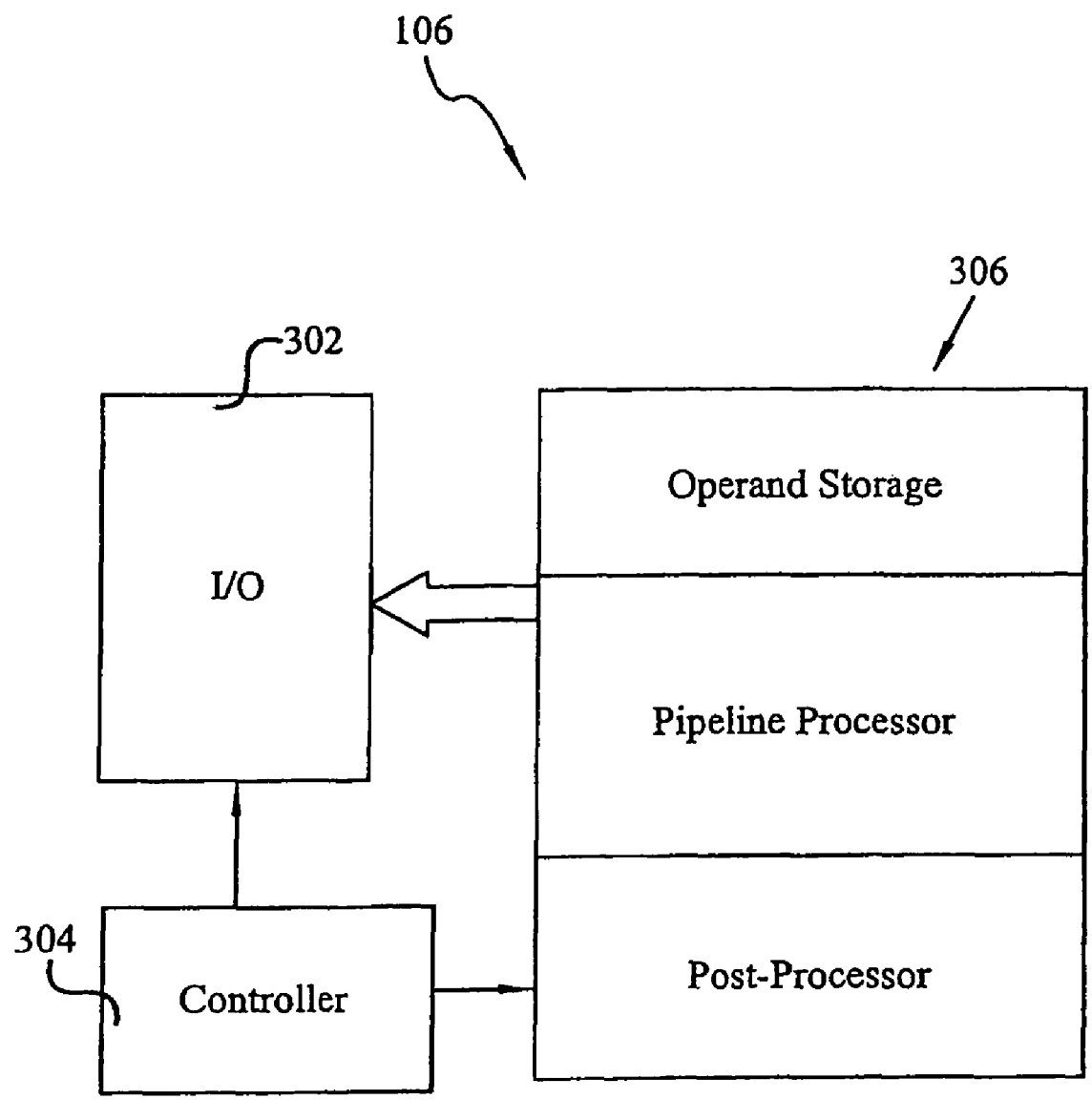
FIG. 3 is a functional block diagram of a modulo processor according to an embodiment of the present invention.

As FIG. 3 depicts, the modulo processor 106 comprises three main functional blocks—an I/O interface 302, a controller 304, and a processing unit 306. The I/O interface 302 is coupled to both the controller 304 and the processing unit 306, and functions similar to that of the system I/O interface 102 discussed above. Therefore, further discussion of its operation will not be provided. The controller 304, which is coupled to both the I/O interface 302 and pipeline processing unit 306, controls the overall operation of both devices. In particular, data transfer to and from the processing unit 306, via the I/O interface 302, is controlled by the controller 304. In addition, the timing and various operations performed internally within the processing unit 306 are controlled by the controller 304. It is to be appreciated that the operation of the controller 304 may be implemented by either firmware or externally loaded software. In a preferred embodiment, however, the controller 304 is an 8-bit RISC controller.

The processing unit 306 includes an operand storage portion 308, a pipeline processing portion 310, and a post-processor portion 312. Generally, the operand storage portion 308 receives and, at least temporarily, stores the operands of a modulo mathematic argument that needs to be computed by the modulo processor 106. For example, if the modulo processor needs to compute AB mod N or $A^E$ mod N, the operand storage portion 308 will receive, via the I/O interface 302, data representative of each of the operands A, B, E, and N. It is noted that although from a pure mathematical standpoint N is more correctly referred to as a modulus rather than an operand, in this instance, and throughout the description, for convenience it too will be referred to as an operand.

The pipeline processing portion 310 is coupled to the operand storage portion 308 and receives one or more of the operands stored therein. The pipeline processing stage 310 then iteratively computes a running partial modulo product a predetermined number of times using at least a portion of the one or more received operands in each iteration. When the predetermined number of partial modulo product computational iterations is complete, thus producing a final partial modulo product, this final partial modulo product is output to the post-processor portion 312.

The post-processor portion 312 is coupled to both the operand storage portion 308 and the pipeline processing portion 310. The post-processor portion 312 receives the final partial modulo product output from the pipeline processing portion 310. Using these data, the post-processor portion 312 computes the final result of the modulo mathematic argument. The post-processor portion 312 also provides an output to the operand storage portion 308. This particular output, as will be discussed in more detail further below, is used when the modulo processor 106 is being used to perform modulo exponentiation.

A more detailed description of the operations performed in each of the above-described stages will be provided further below. However, before proceeding to that discussion, a more detailed description of a preferred hardware configuration that embodies each of the above-described stages of the modulo processor 106 will first be provided. In doing so, attention should now be turned to FIG. 4, which depicts a detailed functional block diagram of the processing unit 306.

Turning first to the operand storage portion 308, it can be seen that this portion preferably includes a plurality of data storage devices. These storage devices may be any one of numerous devices known in the art that function to receive and store data, and to output all or any portion of the stored data. It is to be appreciated that the storage devices may be different locations in a single physical memory storage device, such as a random-access-memory (RAM) or, as is preferred, separate physical registers. In particular, the operand storage portion 308 preferably includes at least five registers, a first operand register 414, a second operand register 416, a third operand register 418, a fourth operand register 420, and a counter register 421. Each of the four operand registers 414, 416, 418, 420 are operable to receive and store the operands of the modulo mathematic argument that is to be computed by the processing unit 306 (represented by "A," "B," "E," and "N," respectively), and the counter register 421 is used to store a number representative of a count (represented by "K"). As will be described in more detail below, the controller 304 decrements the number in the counter register 421 after each iterative calculation performed by the pipeline processing stage 310. Thus, the processing unit 306 knows when the predetermined number of iterations are complete.

Reference will now be turned to the pipeline processing stage 310. In general, the pipeline processing stage 310 includes a plurality of "M" identical carry-save processors 422-1, 422-1, 422-3, . . . 422-M. It is to be appreciated that the total number of carry-save processors (e.g., "M") used to implement the pipeline processing stage 310 may be any number that is a multiple of the bit length of the data being processed. However, practically speaking, the number is limited and depends additionally upon the particular radix of the numbers being processed in the pipeline processing stage. As is generally known, the radix is the integer, in a positional number system, by which the significance of one digit place must be multiplied to give the significance of the next higher digit place. For example, in the decimal number system the radix is ten, and in the binary number system the radix is two. Hence, in a particular preferred embodiment, in which the bit length of the data being processed is 1,024 bits and the radix is four, the pipeline processing stage 310 could be implemented using 4, 8, 16, 32, . . . 256 (e.g., M=4, 8, 16, 32, . . . 256) individual carry-save processors. The skilled artisan will appreciate, however, that increasing the number of individual carry-save processors is a design trade-off between speed and size. In particular, as the number of carry-save processors increases, the processing time needed to calculate a particular modulo mathematic argument decreases. Conversely, as more and more carry-save processors are used, the overall size of the hardware needed to implement the pipeline processing stage 310 increases.

Figure 4:
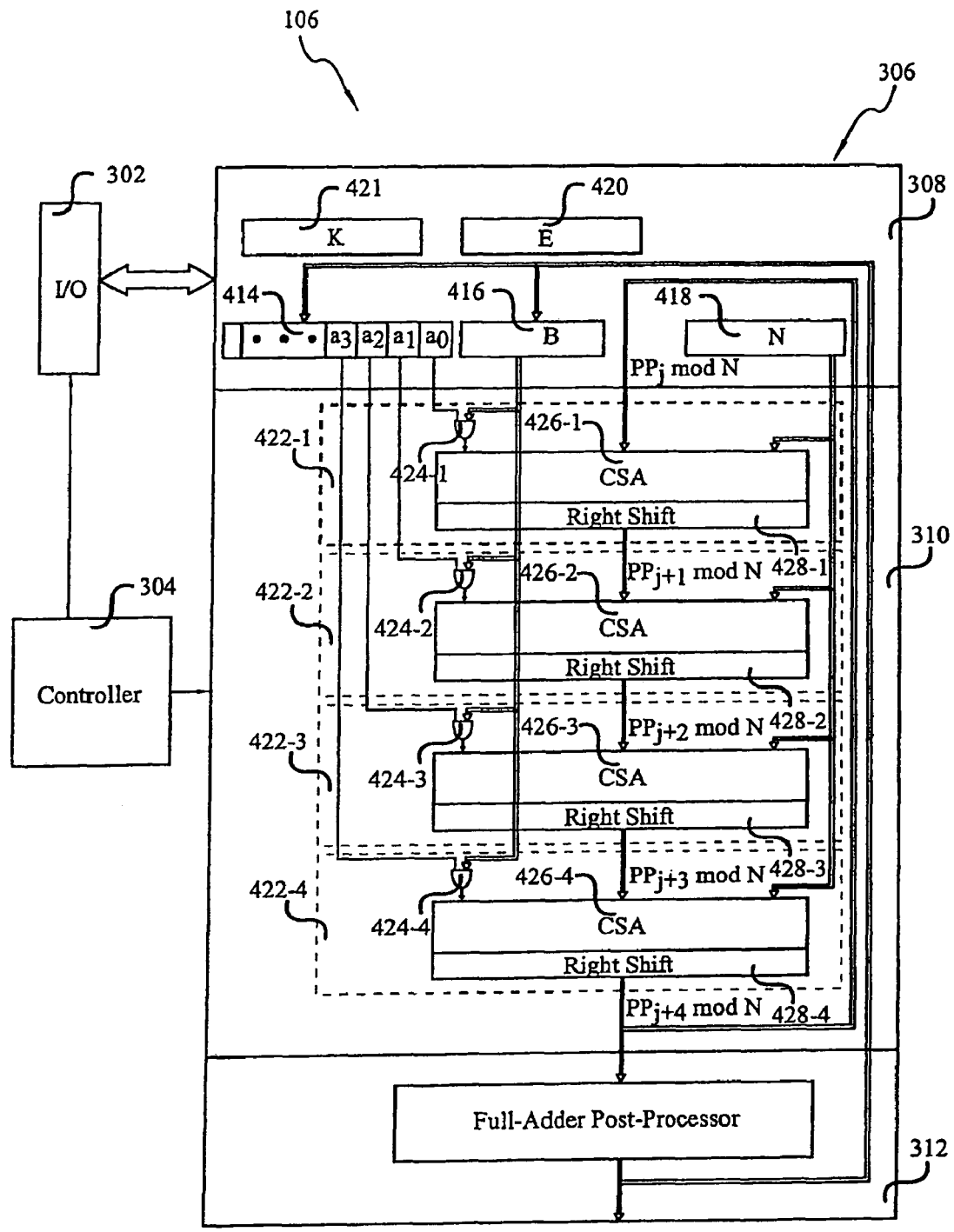
FIG. 4 is a detailed functional block diagram of a processing unit used in the modulo processor of FIG. 3.

Therefore, while it is to be appreciated that the pipeline processing stage 310 of the present invention encompasses embodiments that include any number of "M" carry-save processors, the preferred embodiment depicted in FIG. 4 is implemented using four carry-save processors (e.g., M=4).

That is, the pipeline processing stage 310 includes a first carry-save processor 422-1, a second carry-save processor 422-2, a third carry-save processor 422-3, and a fourth carry-save processor 422-4. Hence, the following detailed description of the pipeline processing stage 310 and each of the carry-save processors 422-1, 422-2, 422-3, 422-4 that comprise the processing stage 310, is directed to this preferred embodiment. The skilled artisan, in reading the description, will appreciate that the description is extended to any number "M." With this background in mind, the preferred embodiment of the pipeline processing stage 310 will now be provided.

Each of the carry save processors 422-1, 422-2, 422-3, 422-4 is coupled to receive a single bit of data stored in the first operand register 414, all of the data bits stored in the second operand register 416, and all of the data bits stored in the third operand register 418. Specifically, with respect to the data stored in the first operand register 414, the first carry-save processor 422-1 is coupled to receive the single data bit stored in the least significant bit position of the first operand register (e.g., the $a_0$ position), the second carry-save adder 422-2 is coupled to receive the single data bit stored in the next position of the first operand register 414 (e.g., the $a_1$ position), third carry-save adder 422-3 the next (e.g., the $a_2$ position), and the fourth carry-save adder 422-4 the next (e.g., the $a_3$ position). As will become more apparent when a discussion of the iterative calculations performed by the pipeline processing unit 306 is provided, the data stored in the first operand register 414 is shifted to the right four bits after each iteration, until all of the data bits stored in the first operand register 414 are utilized in the calculational process.

The carry-save processors 422-1, 422-2, 422-3, 422-4 are coupled together in a series-ring configuration with one another. In other words, the output of the first carry-save processor 422-1 is coupled to the input of the second carry-save processor 422-2, the output of the second carry-save processor 422-2 is coupled to the input of the third carry-save processor 422-3, the output of the third carry-save processor 422-3 is coupled to the input of the fourth carry-save processor 422-4, and the output of the fourth carry-save processor 422-4 is coupled back to the input of the first carry-save processor 422-1. As FIG. 4 further illustrates, the output of the fourth carry-save processor 422-4 is additionally coupled to an input of the post-processor portion 312. The output of each carry-save processor 422-1, 422-2, 422-3, 422-4 is a partial modulo product, referred to herein as $PP_j+i$ mod N.

The subscript "j" represents the number of times data have passed through the pipeline processing portion 310, and "i" represents the number of the particular carry-save processor. Thus, the output of the first carry-save processor 422-1 is represented in FIG. 4 as $PP_{j+1}$ mod N, the output of the second carry-save processor 422-2 as $PP_{j+2}$ mod N, and so on. As will be described in more detail further below, the partial modulo product output from the fourth carry-save processor 422-4, $PP_{j+4}$ mod N, is supplied to either the first carry-save processor 422-1 or the post-processor portion 312. Specifically, it is supplied back to the input of the first carry-save processor 422-1 during the iterative partial modulo product computations, which were generally discussed above and which will be discussed in more detail below, and to the post processor portion 312, as a final partial modulo product ($PP_f$ mod N) when the predetermined number of iterations is complete.

As noted above, each carry-save processor 422-1, 422-2, 422-3, 422-4 is substantially identical and, therefore, each includes the same functional devices. These functional devices include, at least, an AND gate stage 424-1, 424-2, 424-2, 424-4, a carry-save adder (CSA) stage 426-1, 426-2, 426-3, 426-4, and a shift-right stage 428-1, 428-2, 428-3, 428-4. Each of these devices that comprise the carry-save processors will now be described in detail.

The AND gate stages 424-1, 424-2, 424-2, 424-4 will be discussed first. However, before doing so, it is to be appreciated that, although the AND gate stages 424-1, 424-2, 424-3, 424-4 are depicted in FIG. 1 as single AND gates, this is done only for convenience of explanation and illustration. Indeed, the skilled artisan will appreciate that each AND gate stage 424-1, 424-2, 424-3, 424-4 actually comprises a plurality of individual AND gates, one for each data bit in the second operand register 416. Thus, in a preferred embodiment the AND gate stages 422-1, 422-2, 422-3, 422-4 each comprise 1,024 individual AND gates. This will become more apparent when a discussion of cascading multiple modulo processors 106 together is provided further below.

Returning now to FIG. 4, it is seen that each AND gate stage 424-1, 424-2, 424-3, 424-4 includes at least two inputs and one output. One of the inputs of each AND gate stage 424-1, 424-2, 424-2, 424-4 is coupled to receive the single data bits stored in the four least significant positions, respectively, of the first operand register 414, as was described above. The other input of each AND gate stage 424-1, 424-2, 424-2, 424-4 is coupled to receive all of the data bits stored in the second operand register 416. The output of each AND gate stage 424-1, 424-2, 424-2, 424-4 supplies the logic AND of the bit from the first operand register 414 and the data bits stored in the second operand register 416 to its respective CSA stage 426-1, 426-2, 426-2, 426-4. It is to be appreciated that, although the use of AND gates is depicted and described, in an alternative embodiment NAND gates may be used.

Turning now to the CSA stages 426-1, 426-2, 426-2, 426-4, each stage includes at least three data inputs, and a single data output. Specifically, each CSA stage 426-1, 426-2, 426-2, 426-4 includes a first data input, which is coupled to an output of the AND gate 424-1, 424-2, 424-3, 424-4 in its respective carry-save processor 422-1, 422-2, 422-2, 422-4, a second data input, which is coupled to the third operand register 418, and a third data input, which is coupled to receive an output of another carry-save processor 422-1, 422-2, 422-3, 422-4. Specifically, the third data inputs of the second through the fourth CSA stages are coupled to receive an output from the first through the third CSA stages, respectively. With respect to the first CSA stage 426-1, its third data input is coupled to receive an output of the fourth carry-save processor 422-4. Finally, the single data output of each CSA stage 426-1, 426-2, 426-2, 426-4 is coupled to an input of the shift-right stage 428-1, 428-2, 428-2, 428-4 in its respective carry-save processor 422-1, 422-2, 422-2, 422-4. It is noted that the data output from each of the CSA stages 426-1, 426-2, 426-2, 426-4, and thus the pipeline processing portion 310, are in the known carry save adder form. That is, the output data consists of carry bits and sum bits. In order to obtain the true result, the carry bits and sum bits are added together. As will be discussed in more detail below, one of the functions of the post-processor portion 312 is to add the carry bits and sum bits output from the pipeline processing stage 310 to obtain the final modulo mathematic result. Additionally, it is to be appreciated that the single output line shown for each CSA stage 426-1, 426-2, 426-2, 426-4, actually comprises two data output lines, one for the carry bits and one for the sum bits. It is further noted that in a preferred embodiment the CSA stages 426-1, 426-2, 426-2, 426-4 are each implemented using two individual CSA sub-stages. An exemplary block diagram of one such particular preferred CSA stage 426-1, 426-2, 426-2, 426-4 configuration is depicted in block diagram form in FIG. 5, and will now be discussed in detail.

Figure 5:
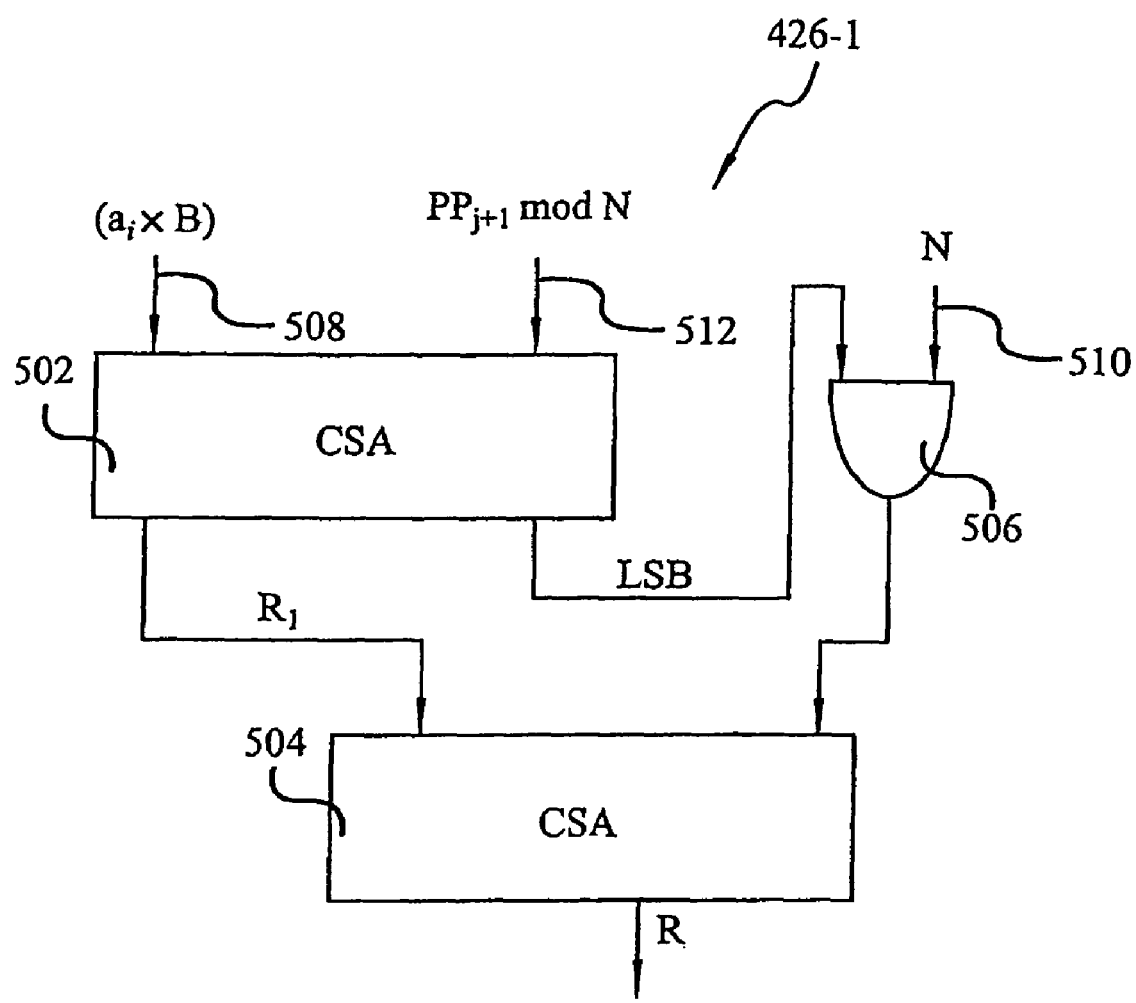
FIG. 5 is a functional block diagram of a carry-save-adder stage used in the processing unit depicted in FIG. 4.

Before proceeding with the detailed description of the exemplary preferred CSA implementation, it is noted that the CSA stage depicted in FIG. 5 is the first CSA stage 426-1. It is to be appreciated, however, that the first CSA stage 426-1 is illustrative of any one of the other CSA stages depicted in FIG. 4. Moreover, as with the AND gate stages 424-1, 424-2, 424-3, 424-4, the CSA stage 426-1 depicted in FIG. 5 is, for convenience of explanation and illustration, shown as comprising single discrete components. It will be appreciated, however, that the CSA stage 426-1 depicted in FIG. 5 actually comprises a plurality of these individual components, one for each data bit in the second 416 and third 418 operand registers. Thus, in a preferred embodiment each CSA stage 422-1, 42-2, 422-3, 422-4 comprises 1,024 of the individual components described below. Again, this will become more apparent when a discussion of cascading multiple modulo processors 106 together is provided further below.

With the above background in mind, it is seen that the CSA stage 426-1 includes a first CSA portion 502, a second CSA portion 504, and an AND gate portion 506, and, as noted above, includes at least three data inputs and a single data output. The first data input 508 is coupled to receive the output of its respective AND gate stage, which in this case is AND gate stage 424-1. The second data input 510 is coupled to received the data stored in the third operand register 418. And, the third data input 512 is coupled to receive the output from one of the other carry-save processors, which in this case, as was described above, is the fourth carry-save processor 422-4. The first data input 508 and the third data input 512 are individually coupled to the two inputs of the first CSA 502, and the second data input 510 is coupled to one of the two inputs of the AND gate 506. Thus, if the least significant sum bit of $R_1$ is a one, then the data in the third operand register (e.g., the modulus "N") is added to it.

The first CSA 502 include two outputs, a first carry-save-word output 514 and a least-significant-sum-bit output 516. The first CSA 502 sums the data output from the AND gate 424-1 and the partial modulo product, $PP_{j+4}$, from the fourth carry-save processor 422-4, and supplies the result, denoted by "$R_1$," via the first carry-save-word output 514. The first CSA 502 additionally supplies, via the least-significant-sum-bit output 516, the least significant sum bit of this same summation, denoted by "LSB," to another of the two inputs of the AND gate 506. The AND gate 506 performs the logical AND function of the LSB and the data in the third operand register 418, and provides an appropriate output to the second CSA 504.

The second CSA 504 includes two data inputs and a single data output. One of the two data inputs is coupled to receive the result "$R_1$" from the first CSA 502, and the other data input is coupled to receive the output of the AND gate 506. The second CSA 504 then sums these two data and outputs the result, denoted as "R," in carry save adder form. The output of the second CSA 504, which is also the output of the first CSA stage 426-1, couples the result "R" to its respective shift-right circuit, which in this case is the first shift-right stage 428-1, and which will now be described.

Returning once again to FIG. 4, the shift-right circuits 428-1, 428-2, 428-3, 428-4, as was just noted above, each receive the data output (e.g., the result "R") from its respectively connected CSA stage 426-1, 426-2, 426-3, 426-4, and shifts the result "R" one bit to the right. This right-shift is equivalent, in the binary numbering system, to dividing the received data by two. The reason for this will become more apparent when a discussion of particular modulo mathematic operations is provided. As FIG. 4 depicts, the output of the first 428-1, the second 428-2, and the third 428-3 shift-right circuits, which are also the outputs, respectively, of the first 422-1, second 422-2, and third 422-3 carry-save processors, are each coupled to an input of the succeeding carry-save processor. That is, each output is coupled, respectively, to an input of the second 422-2, the third 422-3, and the fourth 422-4 carry-save processors. However, the output of the fourth shift-right stage 428-4 in the fourth carry-save processor 422-4 is coupled, as was mentioned above, to both an input of the first carry-save processor 422-1 and to an input of the post-processor portion 312. As was alluded to above, when the fourth carry-save processor 422-4 outputs a partial modulo product, $PP_{j+4}$ mod N, it is supplied back to the first carry-save processor 422-1. Conversely, when the fourth carry-save processor 422-4 outputs a final partial modulo product, $PP_f$ mod N, it is supplied to the post-processor portion 312.

The post-processor portion 312, as was previously noted, receives the final partial modulo product, $PP_f$ mod N, from the fourth carry-save processor 422-2 in the pipeline processing portion 310, and computes either the final result of the modulo mathematic argument or, as will be discussed more fully below, a final result of a particular iteration when the modulo processor 106 is being used for modulo exponentiation. In particular, the post-processor portion 312 is coupled to selectively receive at least the final partial modulo product, PPf mod N, from the fourth carry-save processor 424-4 in the pipeline processing portion 310. The data output from the post-processor portion 312 is then provided to either the I/O interface 302, or, as will become more apparent further below, is supplied to the first operand register 414, the second operand register 416, or both, for further processing.

The post-processor portion 312 comprises a full adder that adds the carry bits and sum bits output from the pipeline processing stage 310 to obtain a binary value of the final partial modulo product, PPf mod N. The post-processor portion 312 may be implemented using any one of numerous well-known hardware implementations, software implementations, or combinations thereof. However, in a preferred embodiment post-processor portion 312 additionally supports modulo addition, and calculations for converting operands into the well-known Montgomery form (e.g., $A = Ar^{2(n+8)}$ mod N). One such preferred full adder post-processor is disclosed in U.S. patent application Ser. No. 09/970,901, entitled METHOD AND SYSTEM FOR A FULL-ADDER POST PROCESSOR FOR MODULO ARITHMETIC, by Langston et al., filed on concurrently herewith, the entirety of which is incorporated herein by reference.

The modulo processor 106 of the present invention supports multiple modulo mathematic operations including, but not limited to, modulo multiplication (e.g., AB mod N), modulo exponentiation (e.g., $A^E$ mod N, $A = A^2$ mod N, $A = Ar^2$ $(n+8)$ mod N), and modulo reduction (e.g., A mod N). As was noted above, in a preferred embodiment the modulo addition operation is performed in the post-processor portion 312. The pipeline processing portion 310 and the post-processor portion 312, in combination, perform the modulo multiplication, modulo reduction, and modulo exponentiation operations. Thus, these latter three operations will now be discussed in more detail.

Before proceeding with a detailed discussion of the modulo multiplication and modulo exponentiation operations implemented by the modulo processor 106, some introductory information will first be provided so that the subsequent discussion is clear. In the following discussion, modulo multiplication is represented by AB mod N and modulo exponentiation by $A^E$ mod N. Moreover, it is noted that the operands "A" and "B" are first converted into binary representations of the well-known Montgomery form. By placing the operands into Montgomery form, the modulo processor 106 utilizes Montgomery multiplication, which is an efficient calculational tool. A detailed description of Montgomery multiplication is disclosed in "Modular Multiplication Without Trial Division," by Peter Montgomery, which appeared in Mathematics of Computation, vol. 44, no. 170, April 1995, the entirety of which is hereby incorporated by reference.

With the above background in mind, a detailed discussion of the modulo multiplication and modulo exponentiation operations implemented by the modulo processor 106 will now be provided. In doing so, reference will be made to FIGS. 6, 7 and 8, which depict the specific processes in flowchart form. In this regard, the parenthetical references to "BLOCKS" in the proceeding discussions correspond to the numbered flowchart blocks in the respective figures.

Figure 6:
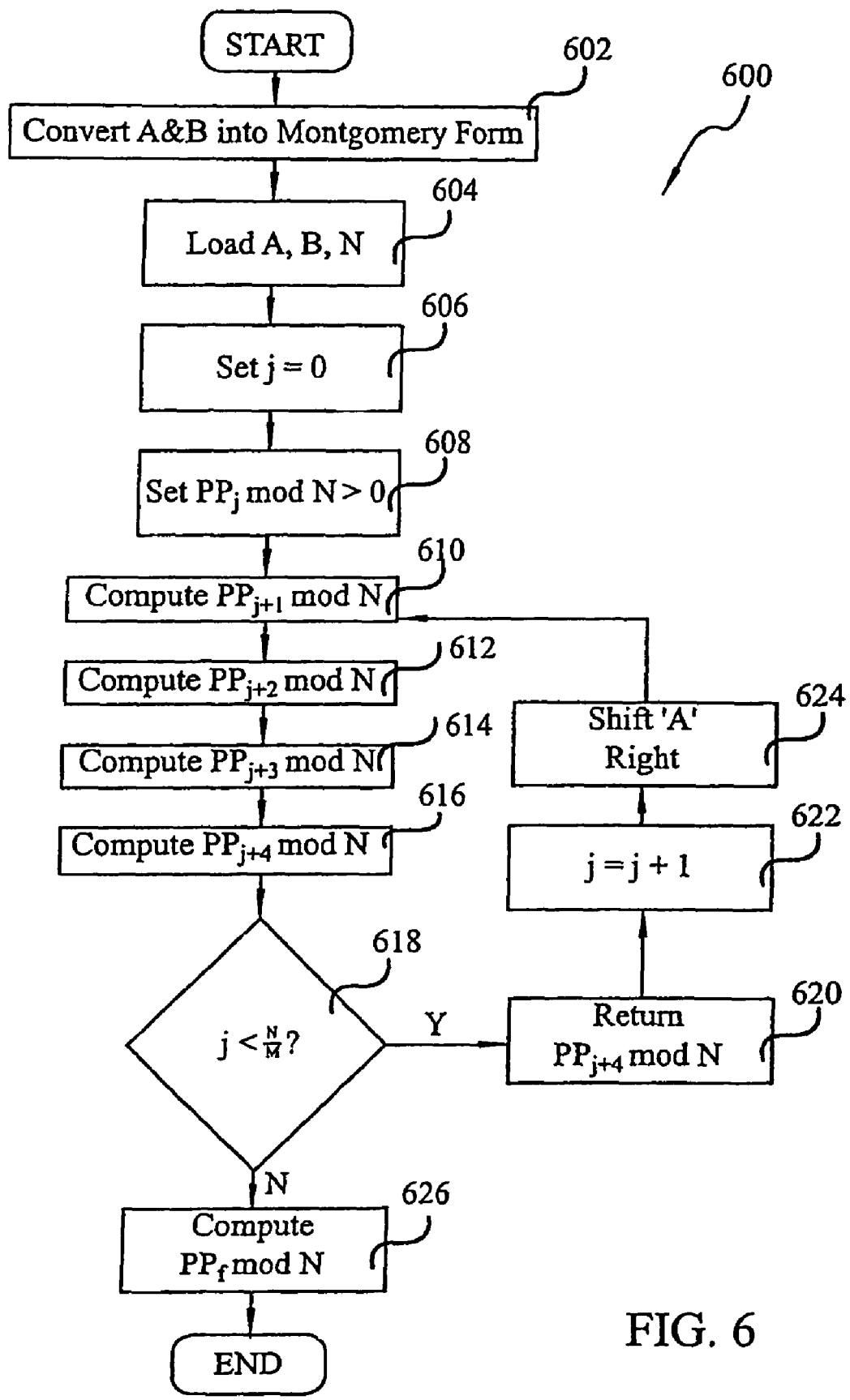
FIG. 6 is a flowchart depicting a modulo multiplication process implemented by the modulo processor depicted in FIG. 3 according to an embodiment of the present invention.

Turning first to FIG. 6 a process 600 carried out by the modulo processor to implement modulo multiplication (e.g., AB mod N) will first be described. Initially, each of the operands A and B are converted into Mongtomery form, either externally, by the post-processor portion 312 alone, or by the modulo processor (e.g., the pipeline processor 310 and post-processor 312 portions in combination) (BLOCK 602). The process for converting the operands A and B into Montgomery form is the same general modulo exponentiation process that will be described in more detail below. In any case, after the A and B operands are converted into Montgomery form, all of the operands A, B, and N are loaded into the first 414, second 416, and third 418 operand registers, respectively (BLOCK 604). The controller 304 then loads the counter register 421 with a zero value (which is representative of the above-noted subscript "j"), which will be subsequently incremented with each iteration of the modulo processor 106 (BLOCK 606), and also sets the initial partial modulo product to zero (e.g., $PP_j$ mod $N=PP_0$ mod $N=0$) (BLOCK 608).

Thereafter, the first carry-save processor 422-1 computes the first partial modulo product (e.g., $PP_{j+1}$ mod $N=PP_1$ mod N) and outputs the result to the second carry-save processor 422-2 (BLOCK 610). The second carry-save processor 422-2 then computes the second partial modulo product (e.g., $PP_{j+2}$ mod $N=PP_2$ mod N) and outputs the result to the third carry-save processor 422-3 (BLOCK 612), which then computes the third partial modulo product (e.g., $PP_{j+3}$ mod $N=PP_3$ mod N) and outputs the result to the fourth carry-save processor 422-4 (BLOCK 614). The fourth carry-save processor 422-4 similarly computes the fourth partial modulo product (e.g., $PP_{j+4}$ mod $N=PP_4$ mod N) and outputs the result (BLOCK 616).

After the fourth carry-save processor 422-4 computes the fourth partial modulo product, the count value (j) is compared to a predetermined number (Y) to determine whether the pipeline processing portion 310 has performed a sufficient number of iterations (BLOCK 618). In general, the predetermined number (Y) is set to the bit length of the modulus (e.g., N) divided by the number of carry-save processors (e.g., M). In other words, Y=N/M. Thus, in the preferred embodiment, the predetermined number (Y) is set to (N=1,024)/(M=4) =256. Returning to the process 600, if the count value 0) is less than Y, then the partial modulo product output from the fourth carry-save processor ($PP_{j+4}$ mod N) is supplied back to the input of the first carry-save processor 422-1 (BLOCK 620), the controller 304 increments the count value in the counter register 421 (BLOCK 622), and the binary representation of operand "A," which is stored in the first operand register 414, is shifted to the right by "M" positions (BLOCK 624). Thus, in the preferred embodiment, where M=4, A is shifted to the right four positions. This way, the next four least significant bits of A (e.g., $a_j$, $a_{j+1}$, $a_{j+2}$, $a_{j+3}$) are used in the next iteration. Conversely, if the count value (j) is equal to Y, then the appropriate number of iterations has been performed and the output of the fourth carry-save processor ($PP_{j+4}$ mod N) is the final partial modulo product $PP_f$ mod N), which is supplied to the post-processor portion 312. The post-processor portion 312 then computes the final result, $PP_f$ mod N, which is equal to AB mod N, by summing together the carry bits and sum bits of the final partial modulo product (BLOCK 626).

Figure 7:
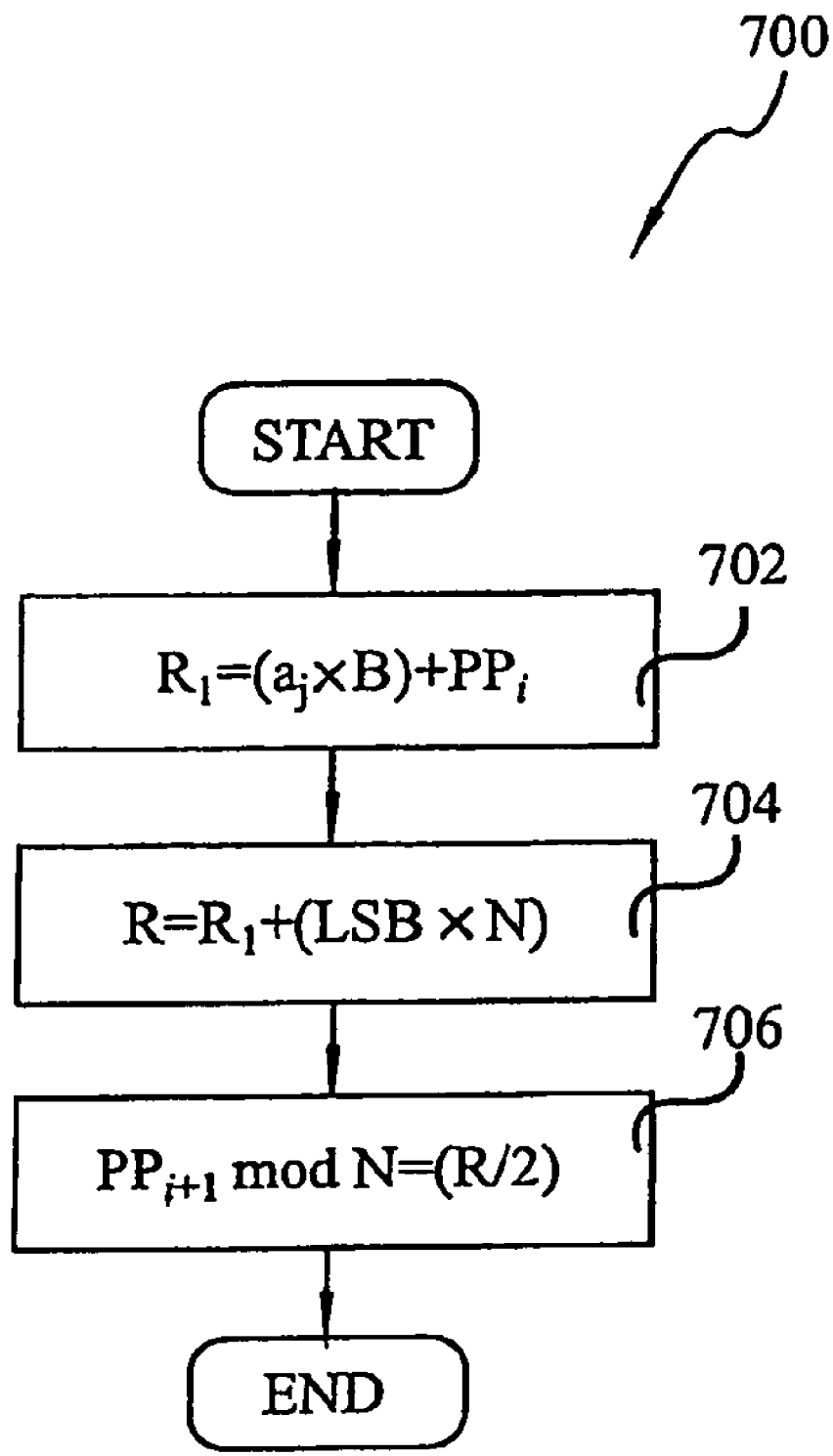
FIG. 7 is a flowchart depicting the process for computing a partial modulo product as implemented by the carry-save-adder stage of FIG. 5.

In order to more fully describe how each carry-save processor 422-1, 422-2, 422-3, 422-4 computes a partial modulo product ($PP_{j+1}$ mod N), reference should now be made to FIG. 7, in combination with FIGS. 4 and 5. Using the first CSA 502, the carry-save processor first computes the result "$R_1$" from the single bit of operand A (e.g., $a_j$) that is ANDed with all of the bits of operand B, and the partial modulo product (e.g., $PP_i$ mod N, where i=j, j+1, j+2, j+3, or j+4) (BLOCK 702). Thus, in mathematical form:

$$R_1 = (a_j \text{ AND } B) + PP_i \text{ mod } N.$$

The second CSA 504 then computes the result "R" from the result "$R_1$" and the logical ANDing of the LSB output from the first CSA 504 and the operand (modulus) N from the third operand register 418 (BLOCK 704). This operation, in mathematical form, is represented as follows:

$$R = R_1 + (\text{LSB AND } N).$$

The result "R" is then divided by two, by shifting it one bit to the right in the shift-right register 428 (BLOCK 706), to obtain the partial modulo product ($PP_{i+1}$). This operation is, of course, represented by:

$$PP_{i+1} \text{ mod } N = R/2.$$

Figure 8:
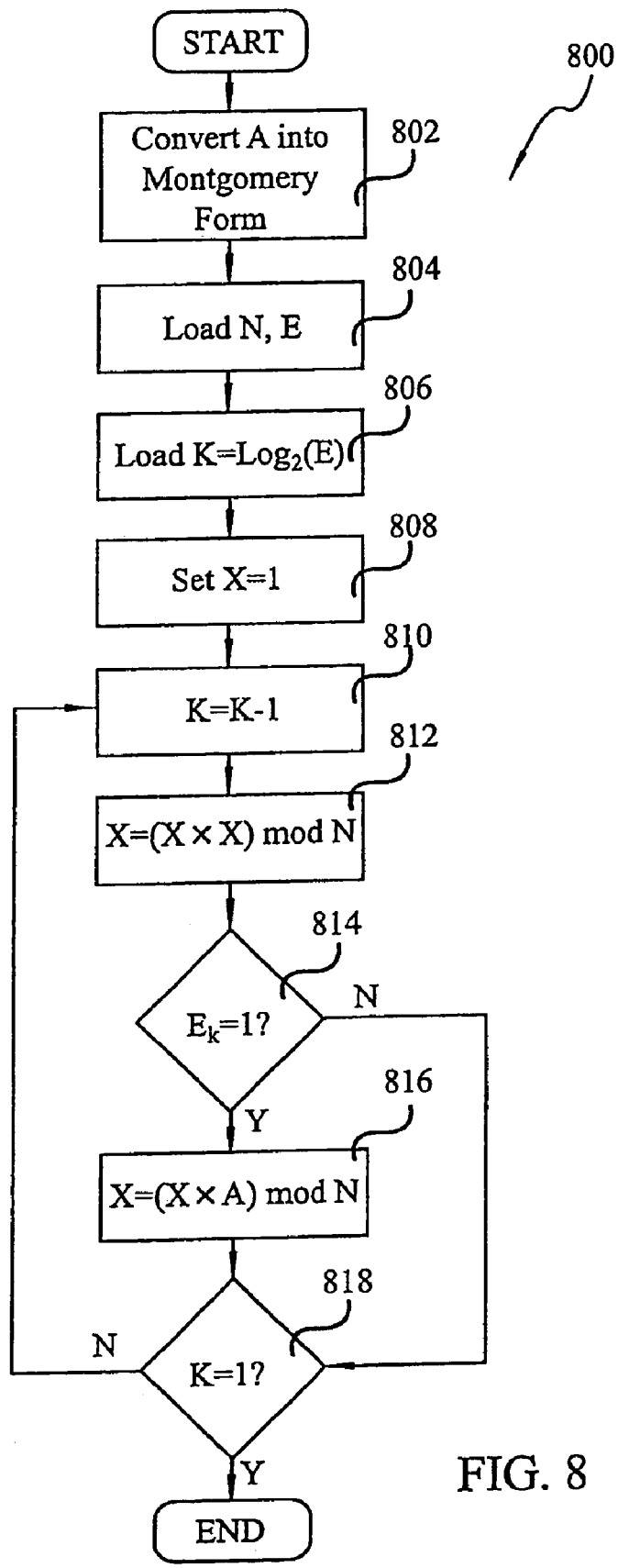
FIG. 8 is a flowchart depicting a modulo exponentiation process implemented by the modulo processor depicted in FIG. 3 according to an embodiment of the present invention.

Turning now to FIG. 8, the modulo exponentiation operation (e.g., $A^E$ mod N) implemented by the modulo processor 106 will now be described. As with the modulo multiplication process 600 described immediately above, the first step in the modulo exponentiation process 800 is to convert operand A into Mongtomery form (BLOCK 802). The I/O interface 302, under control of the controller 304, then loads N and E into the third 418 and fourth 420 operand registers, respectively (BLOCK 804), and loads an initial count value ("K") into the counter register 421 (BLOCK 806). The count value is initialized to the bit length of the exponent. In the preferred embodiment the exponent is the operand loaded into the fourth operand register 420 (e.g., "E"), and has a bit length of 1,024. Additionally, a temporary variable "X" is set to one (e.g., X=1), and is loaded initially into both the first 414 and second 416 operand registers (BLOCK 808).

Thereafter, the count value in the counter register 421 is decremented by one (BLOCK 810), and a first modulo multiplication operation is performed using only the X value loaded into both the first 414 and second 416 operand registers (BLOCK 812). Specifically, the modulo processor 106 carries out the following operation:

$$X = (X*X) \text{ mod } N.$$

This modulo multiplication is performed using the same process 600 described immediately above, except that the X value is used for both the A and B operands. In other words, the pipeline processing portion iteratively calculates the partial modulo products (PPj+i mod N) the first predetermined number of times to obtain the final partial modulo product, $PP_f$ mod N. The post-processor portion 312 then calculates the final result by summing together the carry bits and sum bits of the final partial modulo product. This final result (i.e., the "updated" X value) is then placed into the second operand register 416.

Next, the K-th bit of the exponent (the E operand), stored in the fourth operand register 420, is checked to see if it is a one (BLOCK 814). The K-th bit is the particular bit of the exponent (E) that equals the value of the count (K). In other words, if K=1,022, then the 1,022-th bit of the exponent (E) is checked. Thus, the exponent (E) is scanned from its most significant bit (MSB) down to its least significant bit (LSB). It will be appreciated that present invention is not limited to scanning from MSB to LSB, but could also be done from LSB to MSB by counting up, instead of counting down. In any case, if the K-th bit is a one, then another modulo multiplication operation is performed (BLOCK 816). This time, the value of A is loaded into first operand register 414 and is modulo multiplied with the updated X value in the second operand register 416 (e.g., X=X*A mod N). The count value (K) in the counter register 421 is then checked to determine if it is yet equal to one, meaning that the second predetermined number of iterations has occurred (BLOCK 818). If, on the other hand, the K-th bit of the exponent is not a one, then the (X*A) mod N operation is skipped, and the count value in the counter register 421 is immediately checked to determine if it is equal to one (BLOCK 818). In either case, if the count value (K) is equal to one, then the process ends. However, if it is not equal to one, further iterations through the previously described process occur until the second predetermined number (e.g., bit length of exponent E) of iterations is complete.

In addition to the modulo multiplication 600 and modulo exponentiation 800 processes described above, the modulo processor 106, as was previously noted, is also capable of performing various other modulo mathematic operations. For instance the modulo processor can perform modulo reduction (e.g., A mod N), by loading the A and N operands into the first 414 and third 418 operand registers, respectively, and loading a value of "1" into the second operand register 416 (e.g., B=1), and then performing the modulo multiplication process 600.

The modulo processor 106 can also be programmed to compute modulo exponentiation via a unique variation of the so-called "Chinese Remainder Thereom." As is generally known, according to the Chinese Remainder Theorem, for a plurality of pairwise relatively prime integers, $m_1, m_2, \ldots m_r$, and integers $a_1, a_2, \ldots a_r$, a system of congruences, $X \equiv a_i \pmod{m_i}$ for $1 \# i \# r$, has a unique solution given by:

$$X = a_1 M_1 y_1 + a_2 M_2 y_2 + \ldots a_r M_r y_r,$$

where $M_i = M/m_i$ and $y_i = (M_i)^{-1} \pmod{m_i}$.

It will be appreciated that the process implemented by the modulo processor 106 for modulo exponentiation using the unique Chinese Remainder Theorem variation is for two relatively prime integers (e.g., r=2). Moreover, it will be appreciated that the practical application for which this unique process is carried out is for the RSA public key cryptosystem methodology. According to the RSA methodology, the following data are available: the public encryption exponent (e); the secret decryption exponent (d); two large prime numbers (p, q, where p>q), the product of which is the public encryption/decryption modulus (N=pq); and three variables: $d_p$ ($d_p$=d mod (p−1)), $d_q$ ($d_q$=d mod (q−1)), and Q (Q=$q^{-1}$ mod p).

As is generally known, the RSA public key is the pair (N, e) and the private key is the pair (N, d). Thus, when a first user wants to send an encrypted message to a second user, the first user creates ciphertext (A) by encrypting the plaintext message (X) via a modulo exponentiation process using the public key: $A = X^E \mod N$. In order to decrypt the ciphertext (A), the second user also performs a modulo exponentiation, using the private key, to retrieve the original plaintext message: $X = A^d \mod N$.

Figure 9:
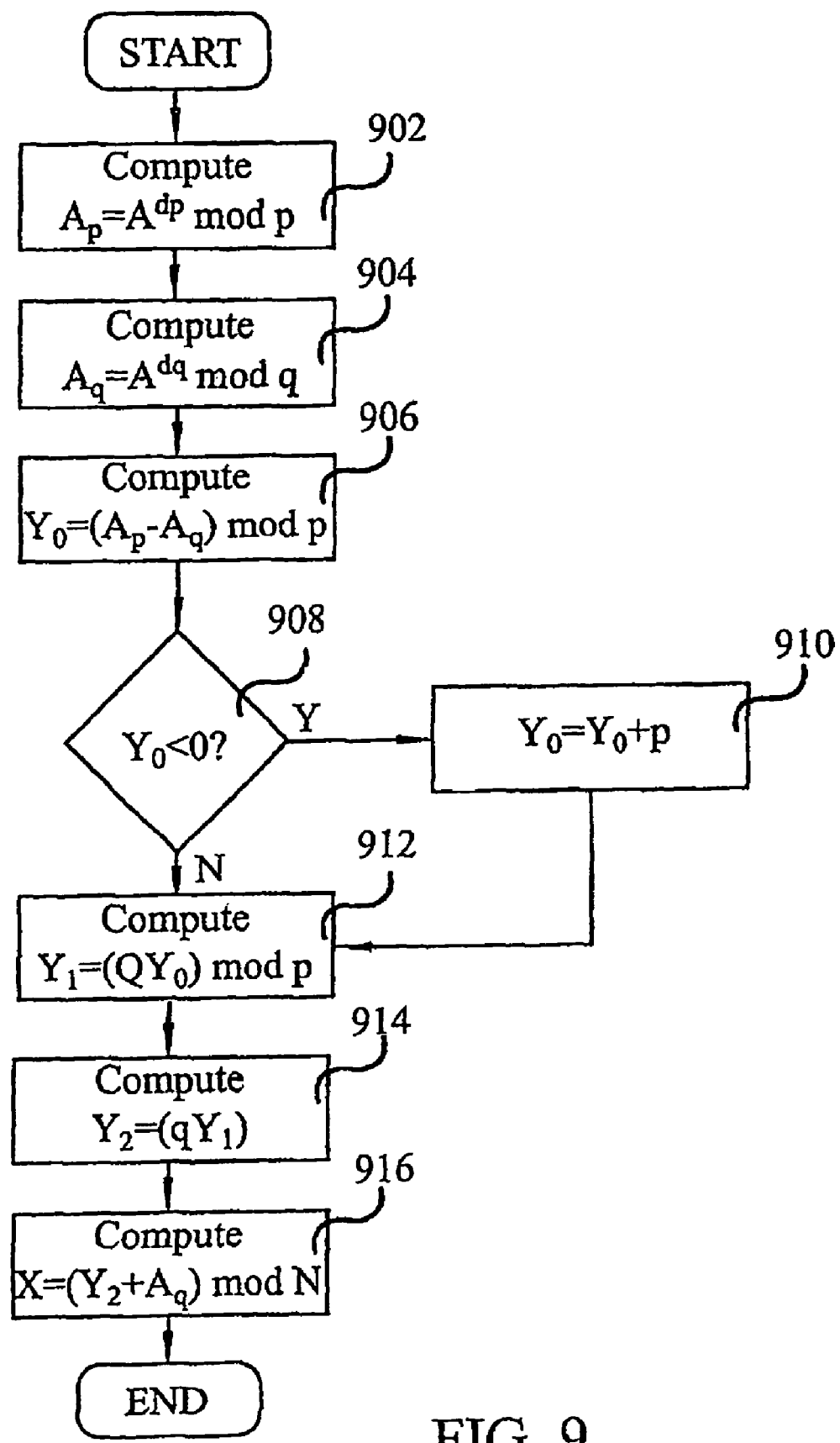
FIG. 9 is a flowchart depicting a unique process implemented by the modulo processor depicted in FIG. 3 for carrying out the Chinese Remainder Thereom.

With the above background in mind, the process implemented by the modulo processor 106 will be described. In doing so, reference should be made to FIG. 9, which depicts the general process 900 in flowchart form, similar to FIGS. 6 and 8. Initially, the modulo processor computes the two values $A_p$ and $A_q$ as follows:

$$A_p = A^{dp} \mod p \text{ and } A_q = A^{dq} \mod q,$$

where the exponent dp=d mod (p−1), and the exponent dq=d mod (q−1), as defined above (BLOCK 902, 904). This modulo exponentiation computation is carried out using the exponentiation process 800 described above and depicted in FIG. 8. Next, these two values are combined in three successive operations. A modulo addition computation is performed first, followed by a modulo multiplication, and then a straight product. Specifically, a first temporary variable, $Y_0$, is computed in the post-processor portion 312 as follows (BLOCK 906):

$$Y_0 = (A_p - A_q) \mod p.$$

The sign bit of $Y_0$ is checked to determine whether the result is negative (BLOCK 908), and if so "p" is added to the result so that $0 \# Y_0 \# p$ (BLOCK 910). Thereafter, the modulo processor 106 uses the first temporary variable, $Y_0$, to compute a second temporary variable, $Y_1$, as follows (BLOCK 912):

$$Y_1 = (Q Y_0) \mod p.$$

This computation is carried out using the modulo multiplication process 600 described above and depicted in FIG. 6. Next, the modulo processor 106 uses the second temporarty variable, $Y_1$, to compute a third temporary variable, $Y_2$, as follows (BLOCK 914):

$$Y_2 = q Y_1 \mod N.$$

Again, this computation is carried out using the modulo multiplication process 600 described above. Finally, the above-noted desired result, X (e.g., the decrypted plaintext message), is computed in the post-processor portion 312, as follows (BLOCK 916):

$$X = (Y_2 + A_q) \mod N.$$

Figure 10:
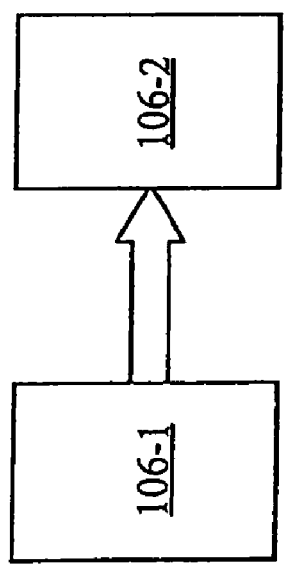
FIG. 10 illustrates two of the modulo processors depicted in FIG. 3 cascaded together in a master-slave configuration.
Figure 11:
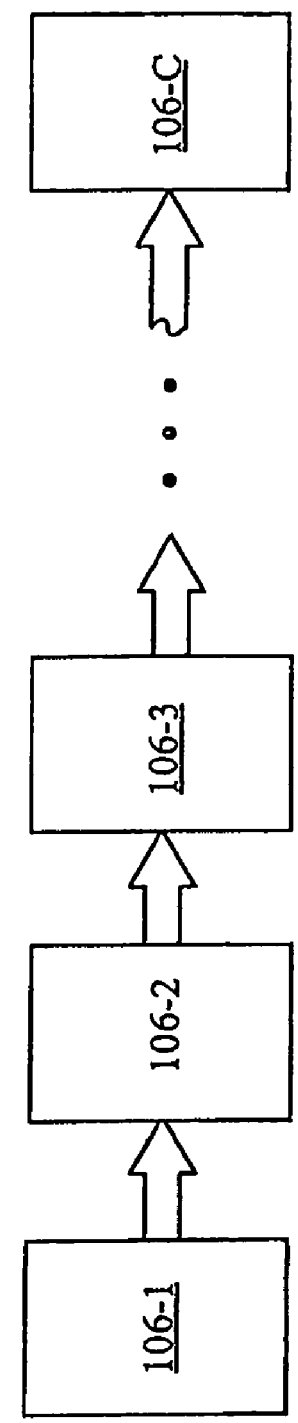
FIG. 11 depicts a plurality of the modulo processors depicted in FIG. 3 cascaded together.

Up to this point, the modulo processor 106 has been depicted and described as a single device that may be coupled to external computing equipment. It is noted, however, that a plurality of modulo processors 106 can be coupled together in a cascade configuration. The cascade configuration may be as little as two modulo processors 106-1, 106-2 coupled together in a master-slave configuration, as depicted in FIG. 10, or up to C modulo processors 106-1, 106-2, 106-3, . . . 106-C cascaded together, as depicted in FIG. 11.

Figure 12:
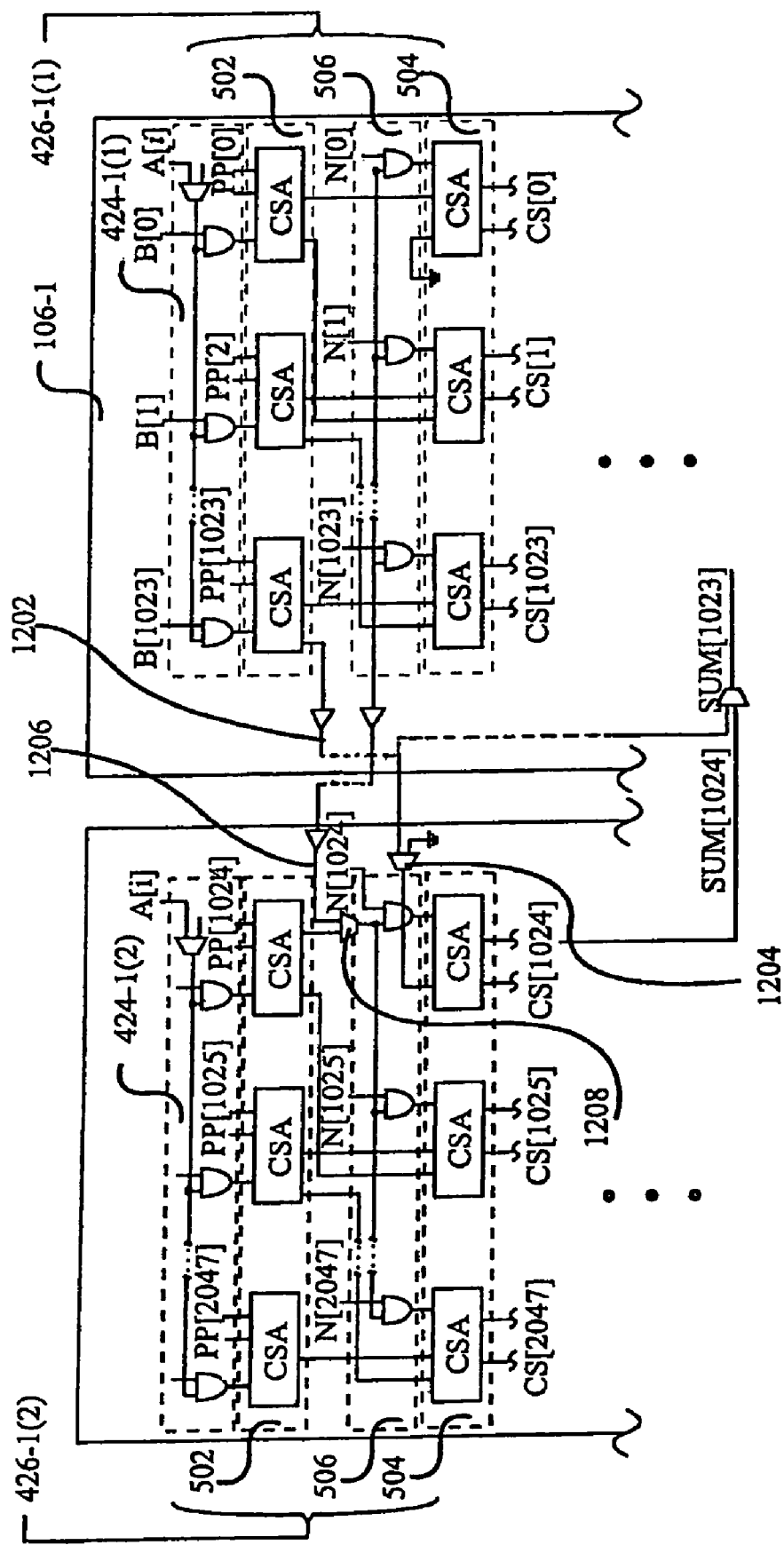
FIG. 12 illustrates in detail how two or more of the modulo processors depicted in FIG. 3 are connected together in the cascade configuration of FIGS. 10 and 11.

Referring now to FIG. 12, a detailed description of how a plurality modulo processors 106-1, 106-2, 106-3, . . . 106-M are coupled together in a cascade configuration will be provided. Before doing so, it should be recalled that each of the stages that make up the individual carry-save processors 422-1, 422-2, 422-3, 422-4, while depicted in many instances as single devices for convenience, actually comprise a plurality of individual devices. For example, in a preferred embodiment each AND gate stage 424-1, 424-2, 424-3, 424-4 comprises 1,024 AND gates, and each CSA stage 426-1, 426-2, 426-3, 426-4 comprises 1,024 of the individual components depicted in FIG. 5. That being said, FIG. 12 depicts the detailed interconnection of portions of two carry-save processors 426-1(1), 426-1(2) in two separate modulo processors 106-1, 106-2. In order to do so, the individual components just mentioned, which comprise the depicted carry-save processor, are shown more explicitly, though obviously, not completely. Specifically, rather than show all 1,024 components of each stage, only the first two and last one in each carry-save processor are depicted. This depicted and described interconnection scheme is followed for the remaining carry-save processors in each modulo processor 106-1, 106-2. Moreover, the skilled artisan will appreciate that the interconnection scheme can be extended to M-number of modulo processors 106-1, 106-2, 106-3, 106-4.

As can be seen from FIG. 12, to couple the two modulo processors 106-1, 106-2 in a cascade configuration, a carry line 1202 is coupled between the carry output of the last CSA of the first CSA stage 502 in the first modulo processor 106-1 and the carry input of the first CSA in the second CSA stage 504 in the second modulo processor 106-2, via a first multiplexor device 1204.

Additionally, a reduction control line 1206 is coupled between the LSB input of the AND gate stage 506 in the first modulo processor 106-1 and the LSB input of the AND gate stage 506 in the second modulor processor 106-2, via a second multiplexor device 1208. With this connection, if the reduction control line 1206 is high (e.g., a logical "1"), then the conditional add of N in the second CSA stage 504 of the second modulo processor 106-2 is governed by the least significant bit in the first modulo processor 106-1. Conversely, if the reduction control line 1206 is low, then the conditional add of N in the second CSA stage 504 of the second modulo processor 106-2 is governed by the least significant bit in the second modulo processor 106-2. Finally, a first sum line 1210 and a second sum line 1212 from each modulo processor 106-1, 106-2 are multiplexed together via a third multiplexor device 1214.

Cascading two or more modulo processors together in the fashion just described and depicted in FIG. 12, allows data having large bit lengths to be processed rapidly and efficiently. For example, in the preferred embodiment, in which one modulo processor 106 can process data having bit lengths of 1,024 bits, by cascading C modulo processors 106 together, data having bit lengths of 1,024×C can be processed.

The present invention is a system and method for performing multiple modulo mathematic operations using a reductive design, in which modulo reductions are performed on iteratively calculated partial products. The hardware and methods implemented by the hardware provides improved performance over known hardware and methods for implementing modulo mathematics.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to any particular embodiment disclosed for carrying out this invention, but that the invention includes all embodiments falling within the scope of the appended claims.

We claim:

1. A method in a modulo processor of performing a modulo N exponentiation of a first operand (A) raised to an exponent (d), wherein N is equal to a product of a first integer (p) and a second integer (q), and wherein a first variable (dp=d mod(p−1)), a second variable (dq=d mod(q−1)), and a third variable (Q=q$^{-1}$ mod p) are known, the method comprising:

computing, by the modulo processor, $A_p = A^{dp}$ mod p;
computing, by the modulo processor, $A_q = A^{dq}$ mod q;
computing, by the modulo processor, $(Y_0) = (A_p - A_q)$ mod p;
computing, by the modulo processor, $Y_1 = (QY_0)$ mod p;
computing, by the modulo processor, $Y_2 = (qY_1)$;
computing, by the modulo processor, $X = (Y_2 + A_q)$ mod N, wherein X is equivalent to $A^d$ mod N.

* * * * *